United States Patent [19]

Mitchell

[11] 4,027,372

[45] June 7, 1977

[54] SEAL EMPLACEMENT TOOLS

[76] Inventor: Gordon Charles Mitchell, 82, Hollows Close, Harnham Wiltshire, Salisbury, England

[22] Filed: Sept. 3, 1975

[21] Appl. No.: 610,056

[30] Foreign Application Priority Data

Sept. 3, 1974 United Kingdom ............. 38476/74

[52] U.S. Cl. .................................. 29/235; 81/9.1 R

[51] Int. Cl.$^2$ ..................... B25B 27/14; B23P 19/02

[58] Field of Search .......................... 29/235; 81/9.1

[56] References Cited

UNITED STATES PATENTS 3,180,015 4/1965 Thompson et al. .................. 29/235

*Primary Examiner*—Al Lawrence Smith
*Assistant Examiner*—Roscoe V. Parker
*Attorney, Agent, or Firm*—Cameron, Kerkam, Sutton, Stowell & Stowell

[57] ABSTRACT

A seal emplacement tool for emplacing flexible ring seals, and including a tube having an open end and for accommodating a folded seal, a plunger in the tube for ejecting the seal from the open end, and a guide externally of and so spaced from the said open end as in use to deflect a seal radially outwards from the plunger axis.

11 Claims, 6 Drawing Figures

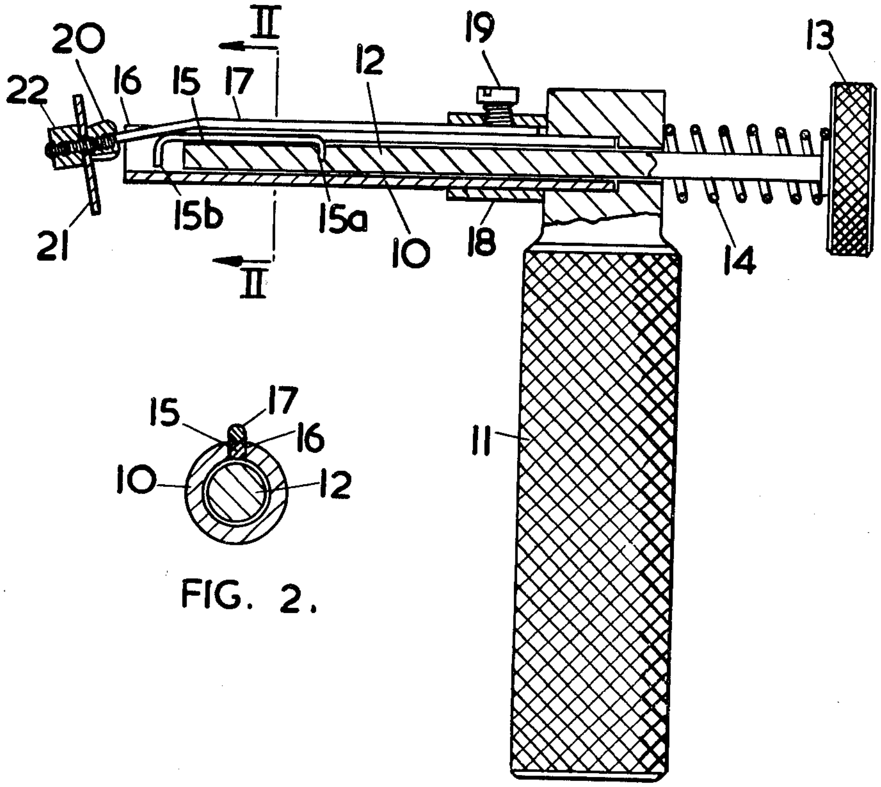
FIG. 2.
FIG. 1.
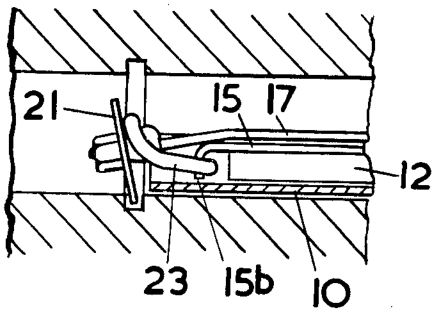
FIG. 3.
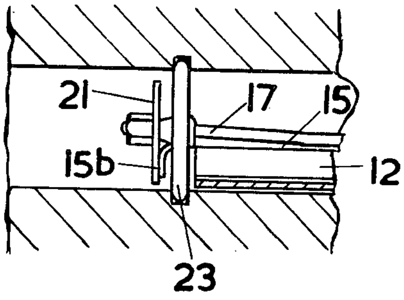
FIG. 4.

SEAL EMPLACEMENT TOOLS

The present invention relates to a tool for emplacing flexible ring seals such as O-ring seals in positions and grooves inside bores, hollows, sleeves etc.

The construction and maintenance of hydraulic, pneumatic and other fluid carrying equipment frequently requires the emplacement and replacement of flexible ring seals such as O-ring seals in positions in bores and hollows, which positions can be exceedingly difficult of access. For example the bore or hollow may be deep or narrow and have steps intermediate the access opening and the designated seal position. Hitherto the emplacement of these seals in such positions has been accomplished eventually by the use of tools resembling those found in a dental surgery. The process has more often then not been very time, patience, and seal consuming, as naturally, if the seal is damaged during fitting it has to be removed and replaced.

The present invention provides a tool for the safe, accurate and rapid emplacement of flexible ring seals in positions inside bores, hollows, sleeves etc.

According to the present invention a tool for internally emplacing flexible ring seals includes a tube having an open end and for accommodating a folded seal, a plunger in the tube for ejecting the seal from the open end, and a guide externally of and so spaced from the said open end as in use to deflect a seal radially outwards from the plunger axis. According to an important feature of the invention the guide may be broader than the exit diameter of the tube and may be arranged to be deflected by the plunger toward the end of an objection stroke thereof, whereby in use a lower portion of the guide may be located in the designated position for the seal prior to and during most of the ejection of the seal and lifted away from the said designated position just prior to location therein of a final portion of the seal.

The guide may include a plate thin enough to locate in a groove designated as the position of a flexible seal. It is preferably mounted at an angle of 5° to 20° from normal to the plunger axis and with the so-called lower edge longitudinally closer the tube than the upper. This can be readily achieved in a guide plate mounted on a pin attached to the tube, the pin being bent to the said angle. With the tube slotted and the end in the pin occurring close to the plate, lifting of the guide as mentioned above can be accomplished by the plunger bearing on the bent portion of the pin. By mounting the guide plate at the said angle, if the lower edge is located in a groove wherein a seal is to be positioned much of the remainder of the plate can be just beyond the groove and serve, bearing in mind the usual resilience of ring seals, to urge the unfolding seal into the groove.

As it is also advantageous that the guide be so sized that it is unlikely that a flexible ring seal will pass between it and the sides of the hollow or bore during ejection, the guide plate may be detachable from the tool and be one of a set of plates of different sizes.

In one embodiment of the invention the plunger has a hook projecting forward and downward therefrom whereby in use the seal can be engaged on the hook and attracted into the tube by withdrawing the plunger. The hook may be arranged to lift the guide as above described.

In order to prevent the plunger, and hence the hook, from rotating in the sleeve, a longitudinal guide may be provided. This may be accomplished with an extension both to the aforementioned slot and to the hook.

A simple embodiment of the invention, for very narrow bores, may lack the hook or guide and may have a guide plate integral with its mounting. It would be loaded by manually folding and feeding the seal into the tube.

While a tool in accordance with the invention may be electrically, pneumatically, or hydraulically operated the power requirement and constructability of the tool are such that a one hand operated mechanical tool will be adequate. Indeed such is preferable as it avoids trailing leads. The tool may thus have a handle and a spring-loaded button for operating the plunger. The natural length of the spring is preferably such as to impose no tension on the smallest seal to be emplaced by the tool. Two embodiments of the invention will now be described by way of example, with reference to the accompanying drawings, of which:

FIG. 1 shows a deluxe internal seal emplacement tool in section,

FIG. 2 is a view on Section II—II in FIG. 1,

FIGS. 3 and 4 illustrate the operation of the tool,

Figure 5:
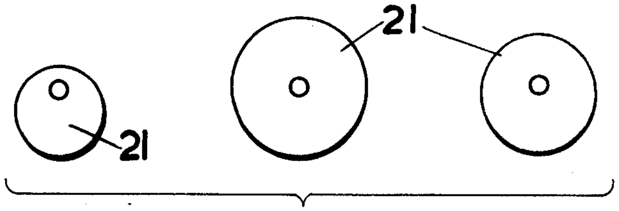
FIG. 5 shows a set of guide plates.

The tool illustrated in FIGS. 1 and 2 comprises a retaining tube 10 attached at one end to a handgrip 11. Sliding in the tube 10 is an operating plunger 12 carrying an operating button 13 and a return spring 14. A retraction pin 15 is interposed between the operating plunger and the retaining tube 10 and is free to slide in a longitudinal split 16 in the retaining tube. The retraction pin has a right angled leg at each end, the leg **15*a* being located in a hole in the plunger 12 and the leg 15*b*** protruding downwards from a point forward of the end of the plunger by an amount sufficient to form a hook for a sealing ring.

On the upper and outer aspect of the retaining tube 10 and lying along the split 16 is a spring rod or mandrel 17 retained at the handgrip end by a retaining collar 18 and a lockscrew 19. The spring rod 17 protrudes forward past the end of the retaining tube, and is bent downwards by about 15° from before this point toward the central axis of the tube forming a cam portion of the rod the split 16 being broadened locally as appropriate, and is threaded to carry a stop 20, a guide plate 21, and a retaining nut 22. A stop 20 has a locating groove (not shown) on its lower surface which accommodates the retraction pin and prevents sideways movement of the guide plate 21.

The arrangement is such that depressing the operating button 13 against the return spring 14 causes the plunger to travel through the retaining tube, carrying the pin 15 forward into contact with the stop 20.

Continued movement deflects the spring rod 17 and the guide plate 21 upwards.

The tool is loaded by depressing the operating button 13 fully and passing a flexible ring seal 23 over the guide plate 21 and engaging it behind the retraction pin leg **15*b*. Releasing the operating button 13 permits the retraction pin leg 15*b* to draw the seal 23, by reaction of the spring 14, into the retaining tube. This action is continued manually if necessary until the forward portion of the seal contacts the stop 20.**

For operation the tool is inserted into the bore of the component to be fitted with an internal seal and the lower edge of the guide plate 21 entered into the groove in which the seal is to be emplaced, with the retaining tube 10 in contact with the lower surface of the bore. The configuration is now as shown in FIG. 3 and it will be noted that due to the bend in the rod 17 much of the upper part of the plate 21 stands just beyond the groove.

The operating button is depressed and the plunger 12 extrudes the seal from the tube 10 to be deflected upwards by the guide plate 21 to enter the seal groove at the top of the bore.

Further travel of the operating plunger extrudes the remainder of the seal, which is deflected by the guide plate 21 to assume its normal shape in the seal groove. In the final stages of movement, the retraction pin contacts the stop, deflecting the spring rod upward to lift the guide plate 21 clear of the seal groove, and extruding the remaining portion of the seal, which expands into the bottom of the groove.

The configuration is now as shown in FIG. 4. With the operating button 13 still depressed, the tool is then withdrawn from the bore.

Guide plates 21 of various sizes to suit seal diameters are selected to pass through the sealing rings but prevent passage of the seal when located in the bore. Holes for attachment to the spring rod are located to give a constant protrusion below the retaining tube for all diameters of the plates 21, see FIG. 5. The plates are rounded and polished at their edges.

The dimensions of the tool may be much as illustrated, the bore of the retaining tube being such as to retain, lubricated if necessary, a folded flexible ring seal therein without damaging it. The external diameter and length of the tube are preferably such as to give access and some visibility in the likely situations. Typically the bore of the tube may be 0.2 to 0.3 inch and the length 3–4, inch for use with rubber O-ring seals of 3/32 inch cross-section. A typical set of guide plates includes three plates ⅜, ½ and ⅝ inch in diameter and these are suitable for use in ⅜–½, ½–⅝ inch, and ⅝–⅞ inch diameter bores respectively.

Figure 6:
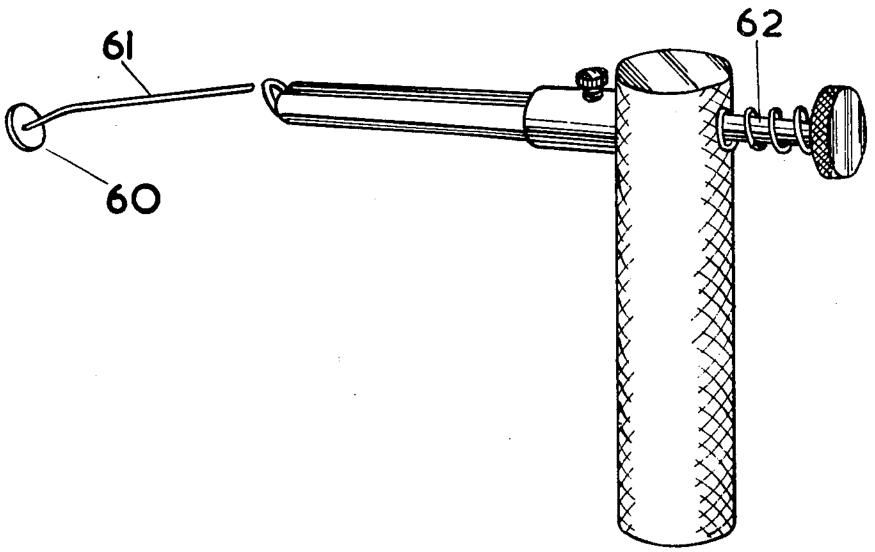
FIG. 6 shows a simple embodiment of the tool.

The simple tool illustrated in FIG. 6 suitable for manufacture for use with smaller bores than the deluxe tool described above, is similar in layout to that tool. It has a guide plate 60 brazed to its spring rod 61. There is no retraction pin or stop and deflection of the plate 60 is afforded directly by the plunger (62) acting on the rod 61. The simple tool is loaded, with the guide assembly 60, 61 detached, by manually feeding the ring seal into the tube. The rod 61 is then passed through the protruding loop of seal, for retention by the collar and lockscrew. It is operated in a similar manner to the de luxe tool.

The simple tool illustrated in FIG. 6 is particularly suitable for use with bore 3/16 to ⅜ inch internal diameter and sealing rings of 1/16 inch cross section thickness. A typical single tool has a retaining tube of 5/32 inch bore and 3/16 inch outside diameter, with a guide plate 3/16 inch diameter.

I claim:

1. An internal seal emplacement tool for internally emplacing flexible ring seals and including a tube having an open end and for accommodating a folded seal, a plunger in said tube for ejecting the seal from the open end, and a guide externally of and so spaced from said open end as in use to deflect a seal radially outwards from the plunger axis, wherein the guide includes cam means radially deflectable by said plunger towards the end of an ejection stroke thereof, whereby in use a portion of the guide may be located in the designated position for the seal prior to and during most of the ejection of the seal and lifted away from the said designated position just prior to location therein of a final portion of the seal.

2. An internal seal emplacement tool as claimed in claim 1 and wherein the guide is a plate thin enough to locate in a groove designated as the position of a flexible seal.

3. An internal seal emplacement tool as claimed in claim 2 and wherein the plate is mounted at an angle of 5° to 20° from normal to the plunger axis.

4. An internal seal emplacement tool as claimed in claim 2 and wherein the plate is mounted on a pin attached to the tube, the pin being bent to the said angle and forming said cam means.

5. An internal seal emplacement tool as claimed in claim 4 and wherein the tube is slotted and the bend in the pin occurs close to the plate so that lifting of the plate is effected by bearing of the plunger on the bent portion of the pin.

6. An internal seal emplacement tool as claimed in claim 1 and wherein the guide is arranged to prevent a flexible ring seal from passing between it and the sides of the hollow during ejection.

7. An internal seal emplacement tool as claimed in claim 2 and wherein the plate is detachable from the tool and is one of a set of different sized plates.

8. An internal seal emplacement tool as claimed in claim 1 and wherein the plunger has a seal engagement hook projecting forward therefrom whereby in use the seal can be engaged on the hook and contracted into the tube by withdrawing the plunger.

9. An internal seal emplacement tool as claimed in claim 1 and which is hand operable and hand powered.

10. An internal seal emplacement tool comprising a tube having an open end and for accommodating a folded seal, a plunger in the tube operable to eject the seal from said open end, a mandrel secured to said tube, a guide including a plate mounted on said mandrel and held externally of said open end and at an angle of 5°–20° from a plane normal to the plunger axis and operable to guide a seal emerging from the tube to unfold and spread out, and said mandrel having a cam means operable by said plunger to radially deflect said guide plate in the final stages of the ejection sequence.

11. An internal seal emplacement tool as claimed in claim 10 and having a hook on the end of the plunger, facing said guide plate and with its opening positionally corresponding to the intermost edge of the guide plate.

* * * * *

UNITED STATES PATENT AND TRADEMARK OFFICE

CERTIFICATE OF CORRECTION

PATENT NO. : 4,027,372

DATED : June 7, 1977

INVENTOR(S) : Gordan Charles Mitchell

It is certified that error appears in the above-identified patent and that said Letters Patent are hereby corrected as shown below:

Column 1, line 18, "then" should read --than--; line 33, "objection" should read --ejection--. Column 4, line 20, "2" should read --3--.

Signed and Sealed this

*Twenty-eighth* Day of *February 1978*

[SEAL]

*Attest:*

RUTH C. MASON
*Attesting Officer*

LUTRELLE F. PARKER
*Acting Commissioner of Patents and Trademarks*